Figure 1:
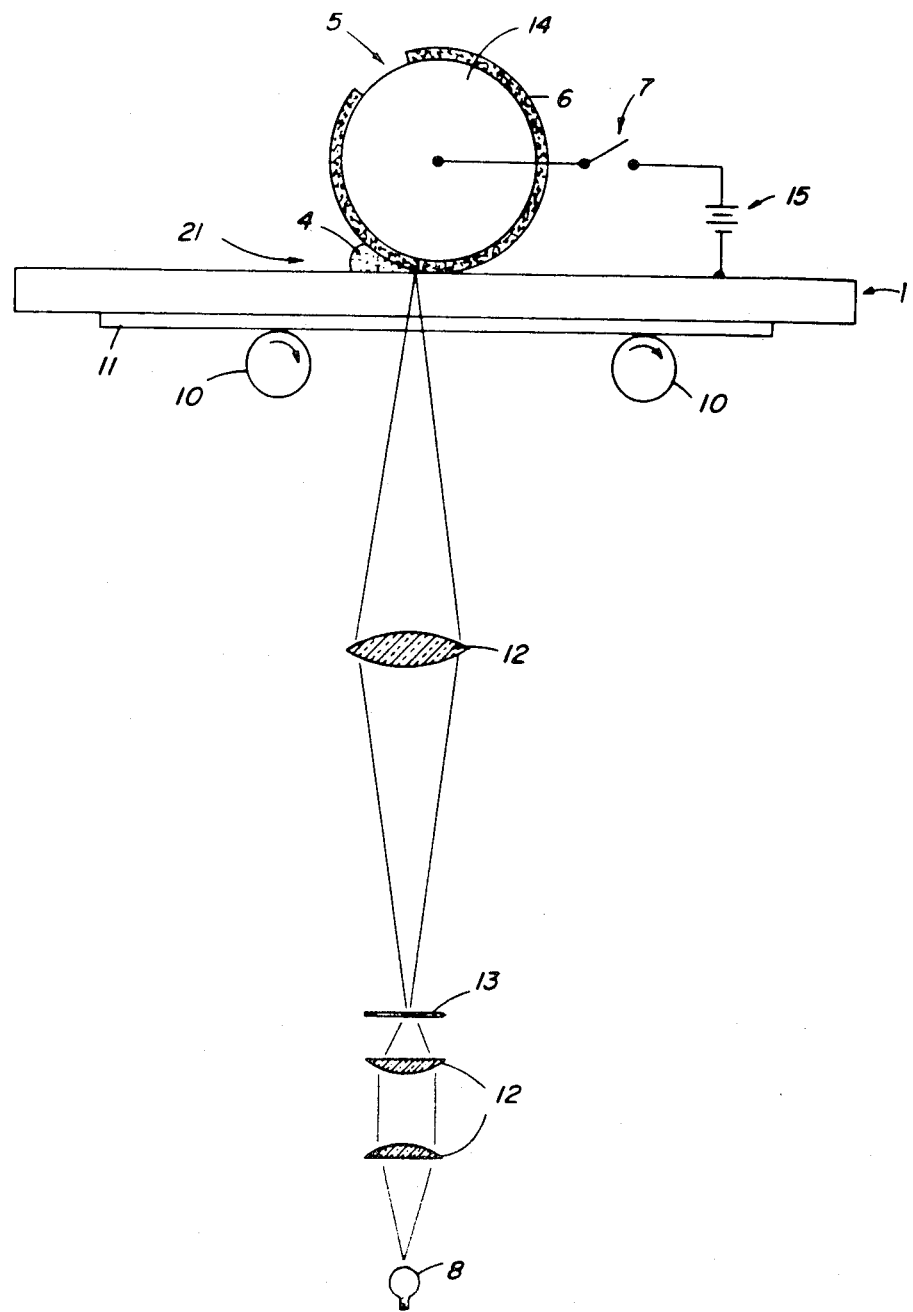

United States Patent [19]

Link et al.

[11] Patent Number: 4,463,076
[45] Date of Patent: Jul. 31, 1984

[54] MEROCYANINE-CYANINE-MEROCYANINE (MCM) ELECTRICALLY PHOTOSENSITIVE COLORANTS FOR PHOTOELECTROPHORETIC IMAGING

[75] Inventors: Steven G. Link; Frank G. Webster, both of Rochester, N.Y.

[73] Assignee: Eastman Kodak Company, Rochester, N.Y.

[21] Appl. No.: 499,769

[22] PCT Filed: Aug. 23, 1982

[86] PCT No.: PCT/US82/01133
§ 371 Date: Feb. 22, 1983
§ 102(e) Date: Feb. 22, 1983

[87] PCT Pub. No.: WO83/00752
PCT Pub. Date: Mar. 3, 1983

[51] Int. Cl.$^3$ .......................................... G03G 13/048
[52] U.S. Cl. .......................................... 430/37; 430/77
[58] Field of Search .......................... 430/41, 77, 37

[56] References Cited
U.S. PATENT DOCUMENTS
4,391,886 7/1983 Frishberg et al. ............... 430/41

FOREIGN PATENT DOCUMENTS
487051 11/1937 United Kingdom.

Primary Examiner—John D. Welsh
Attorney, Agent, or Firm—Torger N. Dahl

[57] ABSTRACT

Electrically photosensitive complex cyanine colorant compounds, each comprising two merocyanine moieties joined by a cyanine moiety, are useful in electrically photosensitive materials for photoelectrophoretic (PEP) imaging processes. These compounds are symmetric or asymmetric and contain the structure:

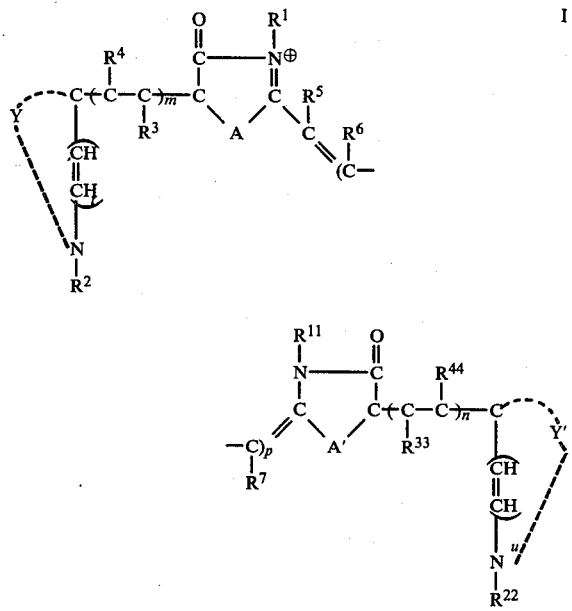

wherein:
m and n, which are the same or different, are 0, 1 or 2;
t and u, which are the same or different, are 0 or 1;
p is 0, 1 or 2;
$R^1$ and $R^{11}$, which are the same or different, represent an alkyl, aryl, aralkyl, alkaryl, carbocyclic or heterocyclic group or, when taken together and p is zero, are a one- or two-carbon alkylene bridge;
$R^2$ and $R^{22}$, which are the same or different represent an alkyl, aryl, aralkyl, alkaryl, carbocyclic or heterocyclic group;
$R^3$ and $R^{33}$, which are the same or different, represent hydrogen or an alkyl group;
$R^4$ and $R^{44}$, which are the same or different, represent hydrogen or an alkyl group;
$R^4$, which when taken together with $R^2$ and t is 0, and $R^{44}$, which when taken together with $R^{22}$ and u is 0, represent the atoms necessary to complete an alkylene or heteroalkylene bridge;
$R^3$ and $R^4$, and $R^{33}$ and $R^{44}$, when taken together, represent the atoms necessary to complete an alkylene or heteroalkylene bridge;

$R^5$, $R^6$ and $R^7$, which are the same or different, represent hydrogen or an alkyl group or, when individually taken together with $R^1$ or $R^{11}$, represent the atoms necessary to complete an alkylene or heteroalkylene bridge; and Y and Y', which are the same or different, represent the atoms necessary to complete a basic heterocyclic cyanine dye nucleus; and A and $A^1$, which are the same or different, represent oxygen, sulfur, selenium or —$NR^4$ wherein $R^8$ represents an alkyl, aryl, aralkyl, alkaryl, carbocyclic or heterocyclic group.

27 Claims, 1 Drawing Figure

MEROCYANINE-CYANINE-MEROCYANINE (MCM) ELECTRICALLY PHOTOSENSITIVE COLORANTS FOR PHOTOELECTROPHORETIC IMAGING

This invention relates to the use of certain electrically photosensitive merocyanine-cyanine-merocyanine (MCM) colorants in photoelectrophoretic (PEP) imaging processes, and to electrically photosensitive materials containing such colorants.

In the past, there has been extensive description in the patent and other technical literature of PEP imaging processes. Descriptions of PEP imaging processes are contained in U.S. Pat. Nos. 2,758,939 by Sugarman issued Aug. 14, 1956; 2,940,847, 3,100,426, 3,140,175 and 3,143,508, all by Kaprelian; 3,384,564, 3,384,488 and 3,615,558, all by Tulagin et al; 3,384,566 by Clark; 3,383,993 by Yen; and 3,976,485 by Groner.

In PEP imaging processes, an imaging layer comprising an electrically photosensitive material is placed between two electrodes, subjected to the influence of an electric field and exposed to an image pattern of electromagnetic radiation to which the electrically photosensitive material is sensitive. This causes electrically photosensitive components in the material to migrate imagewise in the layer to form a record of the imaging electromagnetic radiation.

Regardless of the particular PEP imaging process employed, an essential component of any such process is the electrically photosensitive material. Such materials are composed of an electrically insulating carrier containing electrically photosensitive particles which serve as the migrating components in a PEP imaging process. The particles, in turn, comprise pigments or dyes (herein referred to as colorants) which themselves are electrically photosensitive, or form electrically photosensitive colored particles in association with other photoactive materials.

Certain PEP applications require the use of a colorant which is neutral in hue. Such a neutral colorant must exhibit several properties to give optimum results. In particular, it must exhibit significant absorption across the entire visible region of the spectrum to give it a good neutral hue. It must also exhibit high electrical photosensitivity and possess good light stability.

There exists a continuing effort to find materials which possess useful levels of electrical photosensitivity and exhibit good colorant properties including neutral or near neutral coloration, as well as other desired hues.

The present invention provides electrically photosensitive materials which are useful in PEP processes. The materials comprise particles containing an electrically photosensitive merocyanine-cyanine-merocyanine (MCM) compound comprising two merocyanine moieties joined by a cyanine moiety. These compounds are colorants and contain the following structure:

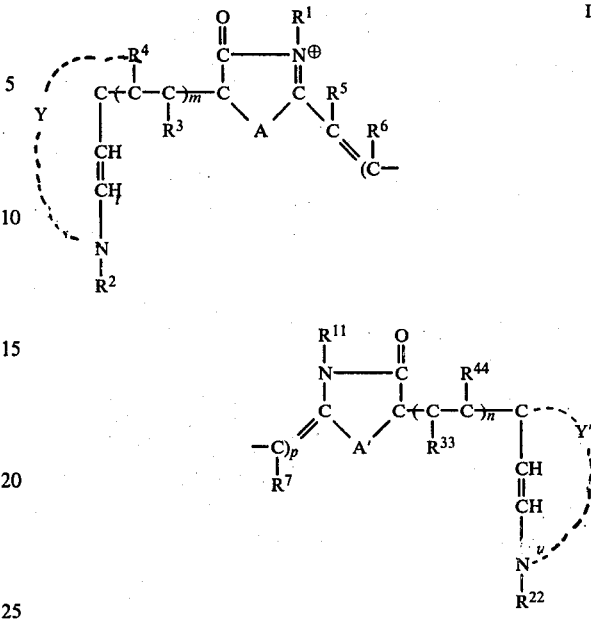

wherein:
m and n, which are the same or different, are 0, 1 or 2;
t and u, which are the same or different, are 0 or 1;
p is 0, 1 or 2;
$R^1$ and $R^{11}$, which are the same or different, represent an alkyl, aryl, aralkyl, alkaryl, carbocyclic or heterocyclic group or, when taken together and p is zero, and a one- or two-carbon alkylene bridge;
$R^2$ and $R^{22}$, which are the same or different, represent an alkyl, aryl, aralkyl, alkaryl, carbocyclic or heterocyclic group;
$R^3$ and $R^{33}$, which are the same or different, represent hydrogen or an alkyl group;
$R^4$ and $R^{44}$, which are the same or different, represent hydrogen or an alkyl group;
$R^4$, when taken together with $R^2$ and t is 0, and $R^{44}$, when taken together with $R^{22}$ and u is 0, represent the atoms necessary to complete an alkylene or heteroalkylene bridge,
$R^3$ and $R^4$, and $R^{33}$ and $R^{44}$, when taken together, represent the atoms necessary to complete an alkylene or heteroalkylene bridge,
$R^5$, $R^6$ and $R^7$, which are the same or different, represent hydrogen or an alkyl group or, when individually taken together with $R^1$ or $R^{11}$, represent the atoms necessary to complete an alkylene or heteroalkylene bridge; and
Y and Y', which are the same or different, represent the atoms necessary to complete a basic heterocyclic cyanine dye nucleus; and
A and $A^1$, which are the same or different, represent oxygen, sulfur, selenium or $-NR^8$ wherein $R^8$ represents an alkyl, aryl, aralkyl, alkaryl, carbocyclic or heterocyclic group.

Each of the foregoing substituents on Structure I, moreover, is optionally further substituted to provide other properties as desired. For example, any alkyl or aryl group is either unsubstituted or substituted by cyano, halogen, hydroxy, sulfo, carboxy, alkoxy, or carboxyalkyl groups as desired.

The present MCM compounds can contain dissociatable counterions such as p-toluenesulfonate, chloro or iodo negatively charged counterions. Alternatively, the compounds can be zwitterionic, in which case the positively charged nitrogen is electrically balanced with a negatively charged substituent such as a $-SO_3^-$, $-PO_3^-$ or $-COO^-$ substituent on one of the R groups of the MCM compound. Preferably, the negatively charged substituent is part of the $R^2$ or $R^{22}$ substituent.

As noted above, each of Y and Y' represents the atoms necessary to complete a basic heterocyclic cyanine colorant nucleus. Preferred nuclei contain from 5 to 6 atoms in the heterocyclic ring, which may be further condensed to another ring system such as an aromatic or heterocyclic ring system. Representative preferred nuclei include:

(a) thiazole nuclei such as:
  (i) thiazoles (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.);
  (ii) benzothiazoles (e.g., benzothiazole, 5-aminobenzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-methylenedioxybenzothiazole, 5-hydroxybenzothiazole, 6-hydroxybenzothiazole, etc.);
  (iii) naphthothiazoles (e.g., naphtho[1,2-d]thiazole, naphtho[2,1-d]thiazole, naphtho[2,3-b]thiazole, 5-methoxynaphtho[2,1-d]thiazole, 5-ethoxynaphtho[2,1-d]thiazole, 8-methoxynaphtho[1,2-d]thiazole, 7-methoxynaphtho[2,1-d]thiazole, etc.);
  (iv) thianaphtheno[7,6-d]thiazole (e.g., 4'-methoxythianaphtheno[7,6,d]thiazole, etc.);

(b) oxazole nuclei such as:
  (i) oxazoles (e.g., 4-methyloxazole, 5-methyloxazole, 4-phenyloxazole, 4,5-diphenyloxazole, 4-ethyloxazole, 4,5-dimethyloxazole, 5-phenyloxazole, etc.);
  (ii) benzoxazoles (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 6-chlorobenzoxazole, 6-methoxybenzoxazole, 5-hydroxybenzoxazole, 6-hydroxybenzoxazole, etc.);
  (iii) naphthoxazoles (e.g., naphtho[1,2-d]oxazole, naphtho[2,1-d]oxazole, etc.);

(c) selenazole nuclei such as:
  (i) selenazoles (e.g., 4-methylselenazole, 4-phenylselenazole, etc.);
  (ii) benzoselenazoles (e.g., benzoselenazole, 5-chlorobenzoselenazole, 5-methoxybenzoselenazole, 5-hydroxybenzoselenazole, tetrahydrobenzoselenazole, etc.);
  (iii) naphthoselenazoles (e.g., naphtho[1,2-d]selenazole, naphtho[2,1-d]selenazole, etc.);

(d) thiazoline nuclei such as thiazoline, 4-methylthiazoline, etc.;

(e) quinoline nuclei such as
  (i) 2-quinolines (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.);
  (ii) 4-quinolines (e.g., quinoline, 6-methoxyquinoline, 7-methylquinoline, 8-methylquinoline, etc.);
  (iii) isoquinolines (e.g., 1-isoquinoline, 3-isoquinoline, 3,4-dihydroisoquinoline, etc.);

(f) imidazole nuclei such as:
  (i) imidazoles (e.g., 4-phenylimidazole, 1,3,4-triphenylimidazole, 1,4-diphenylimidazole, etc.);
  (ii) benzimidazoles (e.g., 1,3-diethylbenzimidazole, 5-chloro-1,3-diethylbenzimidazole, 5,6-dichloro-1,3-diethylbenzimidazole, 1-ethyl-3-phenylbenzimidazole, etc.);
  (iii) naphthimidazoles (e.g., 1,3-diethylnaphth[2,3-d]imidazole, 6-chloro-1,3-diethylnaphth[2,3-d]imidazole, etc.);
  (iv) imidazo[4,5-b]pyridines (e.g., 1,3-diethylimidazo[4,5-b]pyridine, 1,3-diethyl-5,6-dimethylimidazo[4,5-b]pyridine, etc.
  (v) imidazo[4,5-b]quinolines (e.g., 1,3-diethylimidazo[4,5-b]quinoline, 1-ethyl-3-phenylimidazo[4,5-b]quinoline, etc.;

(g) indole nuclei such as:
  (i) 3H-indoles (e.g., 3,3-dimethyl-3H-indole, 3,3,5-trimethyl-3H-indole, 3,3,7-trimethyl-3H-indole, etc.);
  (ii) benzindoles;

(h) pyridine nuclei such as 2-pyridine, 4-pyridine, 5-methylpyridine, etc.;

(i) pyrazole nuclei such as 4,4,5-trimethylpyrazole; and (j) diazole nuclei such as 1,3,4-oxa- or -thiadiazole, or 5-methyl-1,3,4-thia- or -oxathiazole.

Additional nuclei include pyrrole and pyran nuclei and others known by those skilled in the art for use as cyanine dye nuclei.

As noted above, the described MCM compounds are symmetric or asymmetric with respect to the core portion:

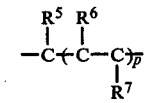

of Structure I; that is, in the case of symmetric compounds, the following substituents are equal: $R^1=R^{11}$, $R^2=R^{22}$, $R^3=R^{33}$, $R^4=R^{44}$, $R^5=R^7$, $Y=Y'$, $A=A'$, $t=u$ and $n=m$. From a synthetic standpoint, the symmetric MCM compounds are preferred. However, from a hue standpoint, an asymmetric MCM compound may exhibit either an increased number of absorption peaks, or broadened peaks across the entire visible region of the spectrum, thereby providing enhanced neutral hue.

Of the groups set forth above, most preferred basic heterocyclic cyanine colorant nuclei comprise 3,3-dialkyl-3H-indole, for example, 3,3-dimethyl- and 3,3-diethyl-3H-indole.

A preferred MCM compound contains the following structure:

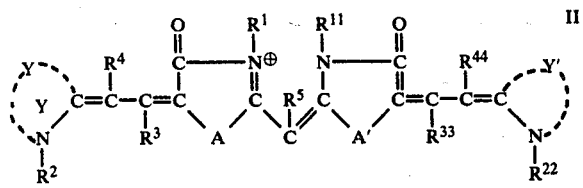

wherein $R^1$, $R^{11}$, $R^2$, $R^{22}$, $R^3$, $R^{33}$, A, A', Y and Y' are as defined with respect to Structure I, and $R^5$ represents hydrogen or alkyl.

The MCM compounds are structurally similar to compounds reported in British Pat. No. 487,051 accepted June 14, 1938. The MCM compounds disclosed in British Pat. No. 487,051, however, are employed as spectral sensitizers for silver halide photographic compositions within which the phenomenon of photoelectrophoresis plays no role. The present invention is made possible by the discovery that particles composed of the MCM compounds defined herein are photoelectrophoretic; i.e., charged particles composed of these compounds are capable of undergoing charge polarity reversal and migrating within an electrically insulating carrier to one of two electrodes when the particles are illuminated in the presence of an electric field.

The MCM compounds have useful photosensitivity and in many cases exhibit exceptionally good light stability. Furthermore, many of these compounds, particularly compounds containing the Structure II color-conferring group, absorb radiation relatively uniformly in the range of from about 400 nm to about 700 nm and therefore exhibit a neutral or nearly neutral density coloration.

The electrically photosensitive material of this invention comprises an electrically insulating carrier, and particles comprising at least one electrically photosensitive MCM compound, as described above, dispersed in the carrier. The carrier is either liquid or liquefiable under use so as to facilitate migration of the particles during use. Other components are optionally present such as any one or more of the following: charge control agent, dispersing polymer, binder polymer, chemical sensitizer, spectral sensitizer and additional colorants which are optionally electrically photosensitive.

The present invention also provides a PEP image-recording method comprising the steps of:

(a) subjecting a layer of an electrically photosensitive imaging material comprising an electrically insulating carrier and an MCM compound as described above to an electric field; and simultaneously, or thereafter, (b) exposing said layer to an image pattern of electromagnetic radiation to which said material is sensitive, to form a record of the image pattern of electromagnetic radiation in said layer.

If the layer is solid, it is at least partially liquefied before, during or after steps (a) and (b) to facilitate migration of the MCM compound in the layer. Means for achieving such liquefication will be described hereinafter.

Representative MCM compounds are included in Table I. The symbol "•" in the Table represents a carbon atom having sufficient hydrogen atoms to satisfy carbon valence requirements.

TABLE I

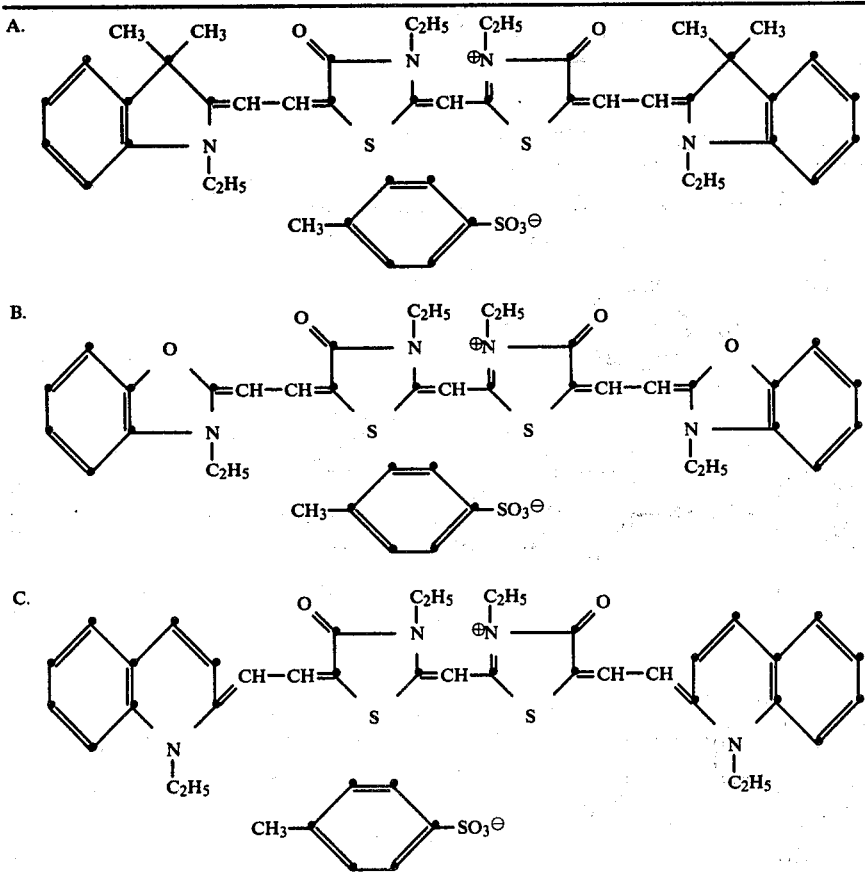

TABLE I-continued
D. 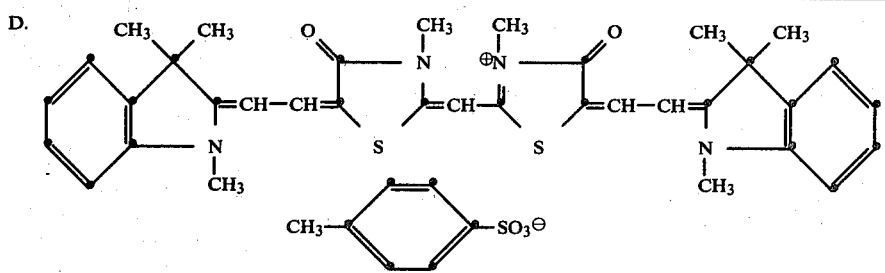
E. 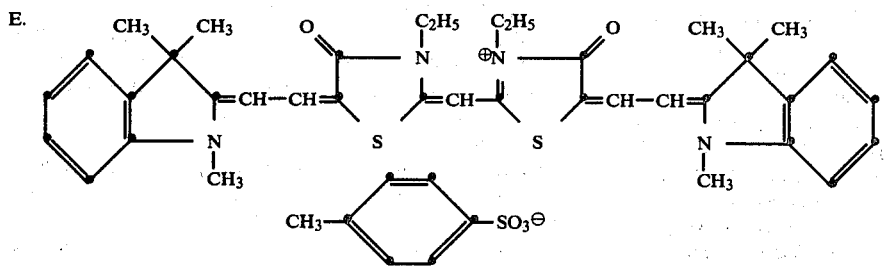
F. 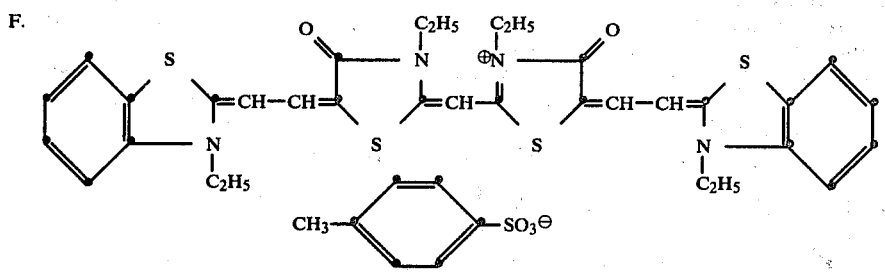
G. 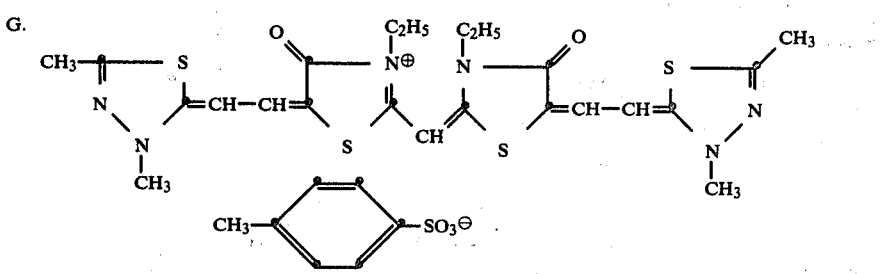
H. 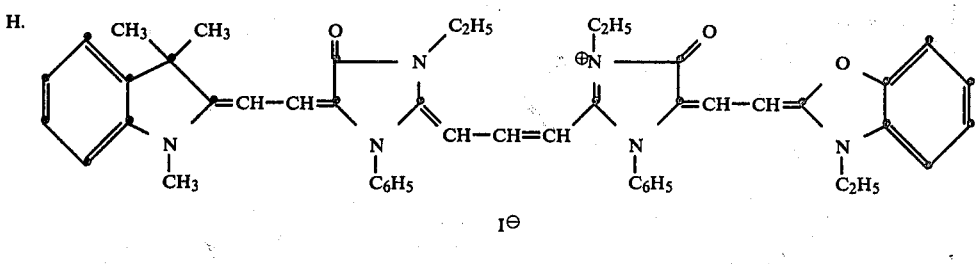
I. 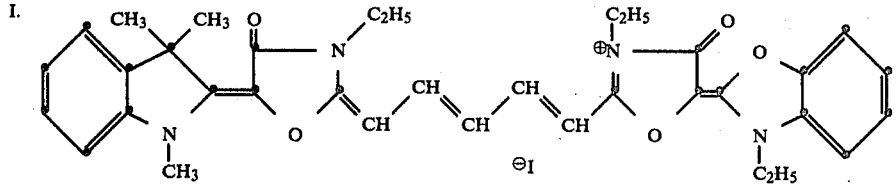

TABLE I-continued

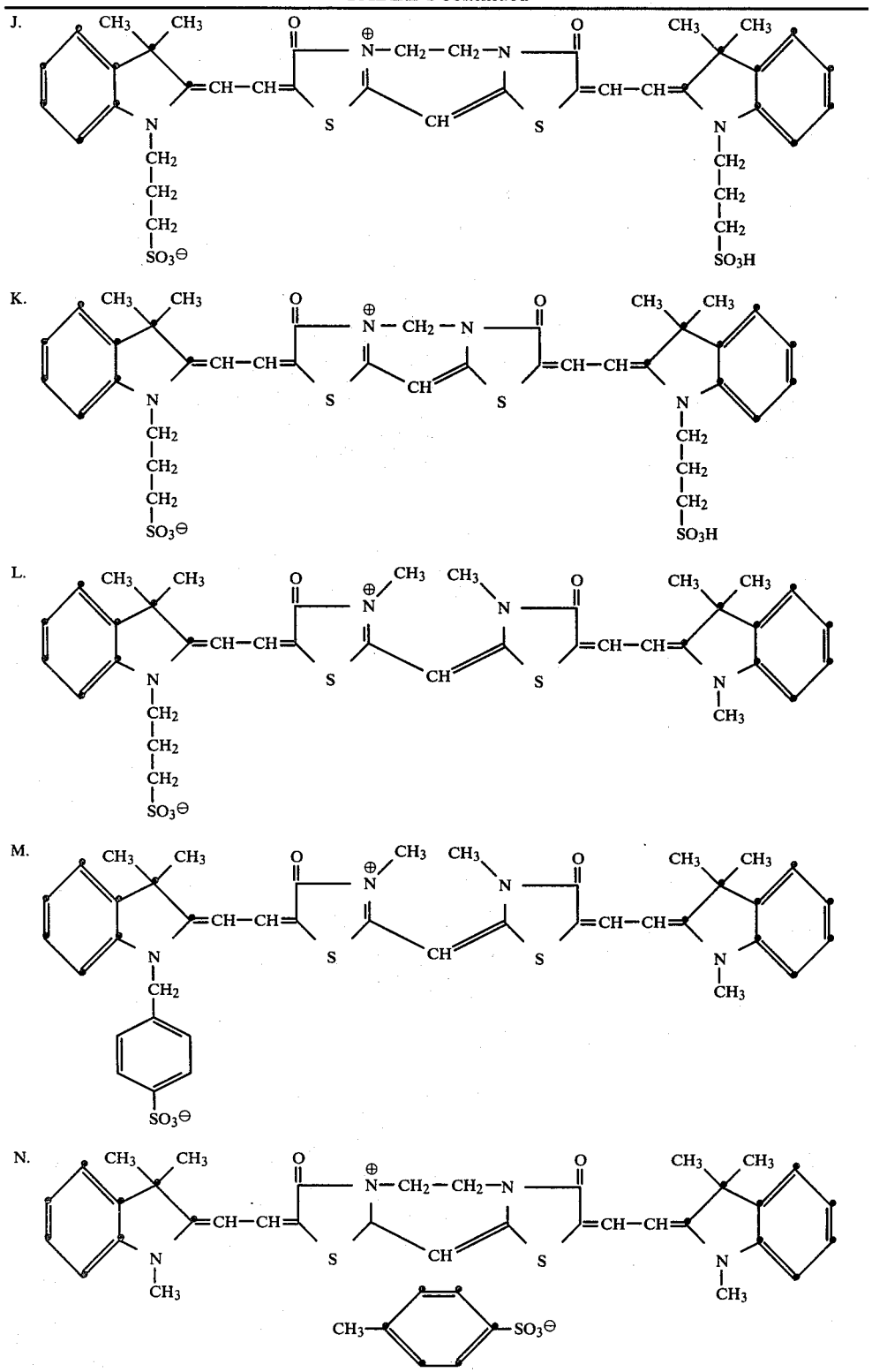

The described MCM compounds are useful in all electrically photosensitive materials, imaging layers and photoelectrophoretic imaging processes which require the combined action of an electric field and exposure to an image pattern of electromagnetic radiation to obain an image. These compounds are also useful in imaging processes such as those described in U.S. Pat. Nos. 3,520,681, 3,770,430, 3,975,195, 4,013,462, 3,707,368, 3,692,516 and 3,756,812, all relating to manifold imaging or photoelectrosolography.

In one PEP imaging process, an element comprising a conductive support, or a support having a conductive layer, in electrical contact with a liquefied or partially liquefied imaging layer of electrically photosensitive material is employed. The layer is uniformly electrostatically charged and then exposed to an image pattern of activating electromagnetic radiation. The electrically photosensitive particles in the imaging layer which have been exposed to radiation migrate through the imaging layer, leaving an undeveloped image record of the charge pattern on the conductive substrate. This image is developed by submerging the element in a solvent which removes or dissolves the exposed or the unexposed portions of the imaging layer.

In another such process, a liquid, or at least a partially liquid, electrically photosensitive imaging layer is positioned between two spaced electrodes. While so positioned between the spaced electrodes, the imaging layer is subjected to an electric field and exposed to an image pattern of activating radiation. As a consequence, the charge-bearing, electrically photosensitive particles in the imaging layer migrate to one or the other of the electrode surfaces to form on at least one of the electrodes an image record representing a positive-sense or negative-sense image of the original image pattern. The image record is developed by separation of the electrodes. In this process the layer of electrically photosensitive material may be sandwiched between two support sheets to form an imaging element. After application of the field and exposure, a visual record of the image pattern is developed on at least one of the two sheets by separation of the sheets. The support sheets may be electrodes, or electrodes may be directly attached to the back surfaces of the support sheets. Alternatively, one or both of the support sheets may be made of a conductive material. In some embodiments, at least one of the sheets is transparent or translucent so as to permit exposure of the imaging layer.

In each of the foregoing processes, the imaging layer of electrically photosensitive material is, or can be rendered, at least partially liquid. The phrase "partially liquid" is used herein to mean that the cohesive forces of the materials forming the layer are sufficiently weak, or weakened, to permit some imagewise migration of the defined MCM compounds, under the combined influence of exposure to activating electromagnetic radiation and an electric field, in the layer of electrically photosensitive material.

In general, imaging layers which are not at least partially liquid may be rendered at least partially liquid by treatment with, for example, heat, a solvent and/or solvent vapors before, during or after the exposure to an image pattern of electromagnetic radiation and application of an electric field. It will be clear to those skilled in the PEP imaging art, that at least partial liquefaction of the imaging layer before or during the application of the field and exposure will achieve results substantially identical with those obtained with an imaging layer which is at least partially liquid to begin with. Good results are obtained if the layer is liquefied subsequent to the exposure and field-application steps. In the latter situation, the imaging layer is liquefied in the presence of a second electric field and the image is developed according to one of the techniques previously mentioned herein.

The extent to which the MCM compounds migrate in those imaging layers which must be liquefied can be controlled by varying the strength and duration of the electric field, the intensity and duration of the exposure, and the time which the imaging layer is exposed to a particular liquefying medium such as heat and/or solvent. For example, if the imaging layer is only slightly liquefied, the compounds will migrate only slightly, thus forming an underdeveloped image record. This image layer, containing the underdeveloped image record, can be stored and developed more fully at a later date. This delayed development can be carried out simply by placing the underdeveloped image layer in an electric field and then liquefying the layer sufficiently to allow the exposed electrically photosensitive material to resume migration. Development of the visual record of the image pattern is then carried out according to one of the above-mentioned techniques.

The electrically photosensitive material of this invention comprises the MCM compounds dispersed in an electrically insulating carrier material such as an electrically insulating liquid, or an electrically insulating, liquefiable carrier, such as a heat- and/or solvent-liquefiable polymer or a thixotropic polymer.

The electrically photosensitive material of this invention will comprise from about 0.05 part to about 2.0 parts of electrophoretic compound for each 10 parts by weight of electrically insulating material.

Useful liquefiable electrically insulating carriers are disclosed in aforementioned U.S. Pat. Nos. 3,520,681, 3,975,195, 4,013,462, 3,707,368, 3,692,516 and 3,756,812. The carrier can comprise an electrically insulating liquid such as decane, paraffin, Shoio Odorless Solvent 3440 TM (a kerosene fraction marketed by the Standard Oil Company, Ohio), various isoparaffinic hydrocarbon liquids, such as those sold under the trademark Isopar G TM by Exxon Corporation and having a boiling point in the range of 145° C. to 186° C., various halogenated hydrocarbons such as carbon tetrachloride or trichloromonofluoromethane, various alkylated aromatic hydrocarbon liquids such as the alkylated benzenes, for example, xylenes, and other alkylated aromatic hydrocarbons such as are described in U.S. Pat. No. 2,899,335. An example of one such useful alkylated aromatic hydrocarbon liquid is Solvesso 100 TM sold by Exxon Corporation. Solvesso 100 TM has a boiling point in the range of about 157° C. to about 177° C. Typically, whether solid or liquid at normal room temperatures, i.e., about 22° C., the electrically insulating carrier used in the present invention has a resistivity greater than about $10^9$ ohm-cm, preferably greater than about $10^{12}$ ohm-cm.

The electrically photosensitive material according to this invention comprises PEP particles having an average particle size within the range of from about 0.01 micron to about 20 microns, preferably from about 0.01 to about 5 microns. Generally, these particles are composed of one or more colorants and/or PEP compounds, including the compounds of the invention.

The MCM compounds can also be combined with polymers containing organic photoconductive repeating units to form electrically photosensitive composite particles. Useful polymers are disclosed in *Research Disclosure*, Vol. 190, February, 1980, Item 1914 (published by Industrial Opportunities Ltd., Homewell, Havant, Hampshire, P09 1EF, United Kingdom), entitled "Composite Electrically Photosensitive Particles".

Charge control agents may be incorporated to improve the uniformity of charge polarity of the electrically photosensitive materials of the present invention. Charge control agents preferably are polymers and are incorporated in the electrically photosensitive materials by admixture with the carrier. In addition to enhancement of uniform charge polarity, the charge control agents often provide more stable suspensions, i.e., suspensions which exhibit substantially less settling out of the dispersed photosensitive particles.

Illustrative charge control agents include those disclosed in U.S. Pat. Nos. 4,219,614 and 4,273,849. The polymeric charge control agents disclosed in U.S. Pat. No. 4,219,614 comprise a copolymer having at least two different repeating units, (a) one of said units being present in an amount of at least about $0.5 \times 10^{-4}$ mole/gram of said copolymer and being derived from monomers selected from the group consisting of metal salts of sulfoalkyl acrylates and methacrylates and metal salts of acrylic and methacrylic acids, and (b) one of said repeating units being derived from monomers soluble in the carrier and present in an amount sufficient to render said copolymer soluble in the carrier material.

Examples of such copolymers are poly(vinyltoluene-co-lauryl methacrylate-co-lithium methacrylate-co-methacrylic acid), poly(styrene-co-lauryl methacrylate-co-lithium sulfoethyl methacrylate), poly(vinyltoluene-co-lauryl methacrylate-co-lithium methacrylate), poly(t-butylstyrene-co-lauryl methacrylate-co-lithium methacrylate-co-methacrylic acid) or poly(t-butylstyrene-co-lithium methacrylate).

Other useful charge control agents include phosphonate materials described in U.S. Pat. No. 4,170,563 and quaternary ammonium polymers described in U.S. Pat. No. 4,229,513.

Various polymeric binder materials such as various natural, semisynthetic or synthetic resins may be dispersed or dissolved in the electrically insulating carrier portion of the electrically photosensitive material to serve as a fixing material for the final PEP image. The use of such fixing addenda is well-known in the art of liquid electrographic developer compositions.

Further addenda include polysiloxane fluids, oils or elastomers to prevent clumping of the particles in the electrically photosensitive material. Preferred oils comprise dimethyl polysiloxanes or siloxanes in which a small portion of the methyl substituents are replaced by phenyl. Such polysiloxanes are available commercially from the Dow-Corning Company under their DC® silicon dispersant series, for example, DC®510, DC®233A and DC®200. Useful results are obtained with polysiloxane oil concentrations of from about ¼ to about 10 weight percent based on the amount of electrically photosensitive particles.

Imaging elements comprising layers of the electrically photosensitive material of this invention are made according to well-known techniques. The elements may be formed simply by dispersing the electrically photosensitive material in an electrically insulating liquid or liquefied carrier and coating the resulting suspension or dispersion on a support according to well-known coating techniques. The support can be insulating or conductive depending on the desired use. Useful supports and coating techniques are described throughout the literature of electrophotography and photoelectrophoretic imaging.

The utility of the electrically photosensitive materials of the invention in a PEP imaging process will be described in more detail with reference to the accompanying drawing, FIG. 1, which illustrates a typical apparatus for carrying out PEP imaging processes.

FIG. 1 shows a transparent electrode 1 supported by two rubber drive rollers 10 capable of imparting a translating motion via original image 11 to electrode 1 in the direction of the arrow. Electrode 1 may be composed of a layer of optically transparent material, such as glass or an electrically insulating, transparent polymeric support such as polyethylene, terephthalate, covered with a thin, optically transparent, conductive layer such as tin oxide, indium oxide, nickel and the like. Optionally, depending upon the particular type of PEP imaging process desired, the surface of electrode 1 may bear a "dark charge exchange" material, such as a solid solution of an electrically insulating polymer and 2,4,7-trinitro-9-fluorenone as described by Groner in U.S. Pat. No. 3,976,485 issued Aug. 24, 1976.

Spaced opposite electrode 1 and in pressure contact therewith is a second electrode 5, an idler roller which serves as a counter electrode to electrode 1 for producing the electric field used in the exemplified PEP imaging process. Typically, electrode 5 has on the surface thereof a thin, electrically insulating layer 6. Electrode 5 is connected to one side of a power source 15 by switch 7. The opposite side of the power source 15 is connected to electrode 1 so that when an exposure takes place, switch 7 can be closed and an electric field applied to the electrically photosensitive material 4 which is positioned between electrodes 1 and 5. Electrically photosensitive material 4 comprises an electrically insulating carrier material such as described hereinabove.

The electrically photosensitive material 4 is formed into a layer between electrodes 1 and 5 by applying the material 4 containing a Table I compound to either or both of the surfaces of electrodes 1 and 5 prior to the imaging process or by placing the dispersion between electrodes 1 and 5 during the PEP imaging process.

As shown in FIG. 1, exposure of layer 4 takes place by use of an exposure system consisting of light source 8, an original image 11 to be reproduced, such as a photographic transparency, a lens system 12, and any necessary or desirable radiation filters 13, such as color filters, whereby electrically photosensitive material 4 is irradiated with a pattern of activating radiation corresponding to original image 11. Although the PEP imaging system represented in FIG. 1 shows electrode 1 to be transparent to activating radiation from light source 8, it is possible to irradiate electrically photosensitive material 4 in the nip 21 between electrodes 1 and 5 without either of electrodes 1 or 5 being transparent. In such a system, although not shown in FIG. 1, the exposure source 8 and lens system 12 is arranged so that electrically photosensitive material 4 is exposed in the nip or gap 21 between electrodes 1 and 5.

As shown in FIG. 1, electrode 5 is a roller electrode having a conductive core 14 connected to power source 15. The core is in turn covered with a layer of insulating material 6, for example, barytacoated paper. Insulating material 6 serves to prevent or at least substantially reduce the capability of electrically photosensitive material 4 to undergo a charge alteration upon interaction with electrode 5. Hence, the term "blocking electrode" may be used, as is conventional in the art of PEP imaging, to refer to electrode 5.

Although electrode 5 is shown as a roller electrode and electrode 1 is shown as essentially a translatable, flat transparent plate electrode in FIG. 1, either or both of these electrodes may assume a variety of alternative shapes such as a web electrode, rotating-drum electrode or opaque-plate electrode, as is well-known in the field of PEP imaging. When the electrically insulating carrier of the electrically photosensitive material 4 is a liquid, electrodes 1 and 5 are spaced such that they are in pressure contact or very close to one another during the PEP imaging process, e.g., less than 50 microns apart. However, when the electrically photosensitive material is simply disposed in the gap between electrodes 1 and 5 as a separate layer on electrodes 1 and/or 5, the electrodes can be spaced more than 50 microns apart during the imaging process.

The strength of the electric field imposed between electrodes 1 and 5 during the PEP imaging process varies considerably; however, it has generally been found that optimum image density and resolution are obtained by increasing the field strength to as high a level as possible without causing electrical breakdown of the carrier medium in the electrode gap. For example, when electrically insulating liquids such as isoparaffinic hydrocarbons are used as the carrier in the imaging apparatus of FIG. 1, the applied voltage across electrodes 1 and 5 typically is within the range of from about 100 volts to about 4 kilovolts or higher.

As explained above, image formation occurs in PEP imaging processes as the result of the combined action of activating radiation and electric field on the electrically photosensitive material disposed between the electrodes. For best results, field application and exposure to activating radiation occur concurrently. However, by appropriate selection of parameters such as field strength, activating radiation intensity, and incorporation of suitable light-sensitive addenda with the electrically photosensitive particles, it is possible to use sequential rather than concurrent field-application and exposure.

When disposed between imaging electrodes 1 and 5 of FIG. 1, electrically photosensitive material 4 exhibits an electrostatic charge polarity. Such charge results from either the triboelectric interaction of the particles or as a result of the particles interacting with the carrier material in which they are dispersed, for example, an electrically insulating liquid. Such charging is similar to that occurring in conventional liquid electrographic developing compositions composed of toner particles which acquire a charge upon being dispersed in an electrically insulating carrier liquid.

In a typical imaging operation, upon application of an electric field between electrodes 1 and 5, the charge-bearing particles within electrically photosensitive material 4 are attracted in the dark to either electrode 1 or 5, depending upon which of these electrodes has a polarity opposite to that of the original charge polarity acquired by the electrically photosensitive particles. It is theorized that, upon exposing electrically photosensitive material 4 to activating electromagnetic radiation, the charge polarity associated of either the exposed or unexposed particles reverses. In PEP imaging systems wherein electrode 1 bears a conductive surface, the exposed charged particles within electrically photosensitive material 4, upon coming into electrical contact with such conductive surface, undergo a reversal of their original charge polarity as a result of the combined application of electric field and activating radiation. Alternatively, in the case of photoimmobilized PEP recording (PIER), wherein the surface of electrode 1 bears a dark charge exchange material as described by Groner in aforementioned U.S. Pat. No. 3,976,485, one obtains reversal of the charge polarity of the unexposed particles, while maintaining the original charge polarity of the exposed electrically photosensitive particles, as these particles come into electrical contact with the dark charge exchange surface of electrode 1. In any case, upon the application of electric field and activating radiation to electrically photosensitive material 4 disposed between electrodes 1 and 5 of the apparatus shown in FIG. 1, one effectively obtains image discrimination so that an image pattern is formed by the electrically photosensitive particle layer which corresponds to the original pattern of activating radiation. Using the apparatus shown in FIG. 1, one obtains a visible image on the surface of electrode 1 and the complementary image pattern on the surface of electrode 5.

Subsequent to the application of the electric field and exposure to activating radiation, the images which are formed on the surface of electrodes 1 and/or 5 of the apparatus shown in FIG. 1 may be temporarily or permanently fixed to these electrodes or may be transferred to a final image-receiving element. Fixing of the final image can be effected by various techniques, for example, by applying a resinous coating over the surface of the image-bearing substrate. For example, if electrically photosensitive material 4 includes a liquid carrier between electrodes 1 and 5, one may fix the image or images formed on the surface of electrodes 1 and/or 5 by incorporating a particulate polymeric binder material in the carrier liquid. Many such binders are well-known for use in electrophotographic liquid developers. They are known to acquire a charge polarity upon being admixed in a carrier liquid. Therefore, they will, themselves, electrophoretically migrate to the surface of one or the other of the electrodes. Alternatively, a coating of resinous binder (which has been dissolved in the carrier liquid) may be formed on the surfaces of electrodes 1 and/or 5 upon evaporation of the liquid carrier.

The electrically photosensitive materials of this invention are preferably used to form monochrome images. Alternatively, the electrically photosensitive materials are used to form polychrome images. In such instances, the material comprises, in addition to the MCM compounds, specific electrically photosensitive cyan, magenta or yellow particles necessary to form the desired polychrome image.

The following examples illustrate the utility of the MCM compounds in PEP imaging processes.

SYNTHESIS OF SYMMETRIC MCM COMPOUNDS

The synthesis of symmetric monomethine MCM compounds is conveniently carried out by forming a merocyanine, followed by coupling two molecules of the merocyanine with malonic acid to form the monomethine bridge of a central cyanine. For illustration, the synthesis of Compound A (5,5'-bis[(3,3-dimethyl-1-ethyl-indolinylidene)ethylidene[-3,3'-diethyl-4,4'-dioxothiazolinocyanine p-toluenesulfonate) of Table I is set forth below. The reaction scheme is as follows:

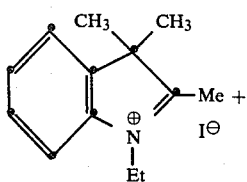  (1)

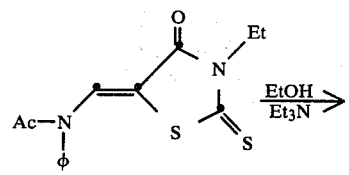

where Me is methyl, Et is ethyl, φ is phenyl and Ac is acetyl.

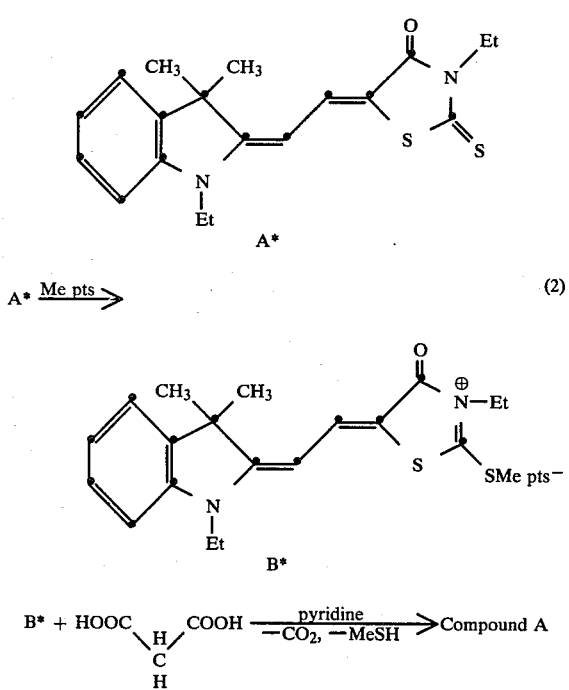  (2)

A* is 5-[(3,3-dimethyl-1-ethyl-2-indolinylidene)-ethylidene]-3-ethylrhodanine
B* is 5-[(3,3-dimethyl-1-ethyl-2-indolinylidene)-ethylidene]-3-ethyl-2-methylthio-4-oxo-2-thiazolinium p-toluenesulfonate Step 1:

A 1-liter, round-bottom flask containing a magnetic stir bar was charged with 63 g (0.2 mole) of 1-ethyl-2,3,3-trimethyl-3H-indolium iodide, 61.5 g (0.2 mole) of 5-acetanilidomethylene-3 -ethylrhodanine, 30.8 ml (0.22 mole) of triethylamine and 500 ml of anhydrous ethanol. The mixture was refluxed with stirring for ½ hr in a 110° C. oil bath. After cooling to 0° C. for several hours, the red crystalline dye A* was filtered, washed with ethanol and air-dried.

Yield: 68.0 g (94.8%).

Step 2:

In a 300-ml, round-bottom flask, 5-[(3,3-dimethyl-1-ethyl-2-indolinylidene)ethylidene[-3-ethylrhodanine (10.7 g, 0.03 mole) and methyl p-toluenesulfonate (18.6 ml, 0.120 mole) were combined and heated over a steam bath for 5 hr. The dark red syrup was diluted to 200 ml with acetone, then refrigerated (0° C.) overnight. The black prisms of B* were filtered, washed with acetone and air-dried.

Yield: 12.07 g (74%).

Step 3:

In a 1-liter, round-bottom flask were placed a magnetic stir bar, 11.97 g (0.022 mole) of 5-[(3,3-dimethyl-1-ethyl-2-indolinylidene)-ethylidene]-3-ethyl-2-methylthio-4-oxo-2-thiazolinium-p-toluenesulfonate, 22.8 g (0.22 mole) of malonic acid and 200 ml of anhydrous pyridine. The mixture was heated strongly until carbon dioxide evolution began, then maintained at a temperature of 100°-105° C. for 1 hr. After cooling to room temperature, the black solution was poured into 2 liters of ether with stirring. The mixture was refrigerated at 0° C. overnight, then filtered. The solid was washed generously with water to remove pyridinium-p-toluenesulfonate, then air-dried. The Compound A dye (4.53 g) was recrystallized from 350 ml (75 ml per gram) of ethanol.

Final Yield: 3.64 g (39.6%).

The synthesis of symmetric trimethine or pentamethine MCM-containing compounds involves the coupling of two molecules of a compound having the structure:

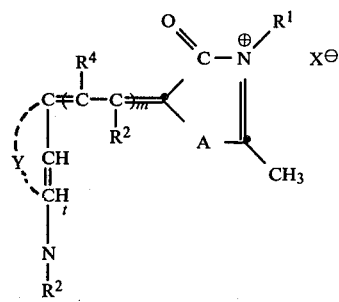

with any one of such materials as diethoxymethyl acetate, ethyl orthoformate, ethyl orthoacetate or ethyl orthopropionate to give trimethine MCM-containing compounds P=1 in Structure I), or with 1,3,3-triethoxypropene to give a pentamethine MCM-containing compound (p-=2 in Structure I).

SYNTHESIS OF ASYMMETRIC MCM COMPOUNDS

Asymmetric MCM compounds were prepared by coupling two dissimilar merocyanine-containing compounds. The synthesis of compound H, Table I, is shown for illustration:

In 7 ml of pyridine, 1.65 g (0.0027 mole) of 2-(2-anilinovinyl)-3-ethyl-4-oxo-1-phenyl-5-[(1,3,3-tri-methyl-2-indolinylidene)ethylidene]-2-imidazolinium iodide were suspended with 1.34 g (0.0026 mole) of 3-ethyl-5-[(3-ethyl-2-benzoxazolinylidene)ethylidene]-2-methyl-4-oxo-1-phenyl-2-imidazolinium iodide. (These two compounds were prepared by the procedure described in U.S. Pat. No. 3,576,639). To the suspension were added 0.75 ml of triethylamine and 0.38 ml of acetic anhydride, and the resulting mixture was heated with stirring at refluxing temperature for 10 min. A tarry but filterable product separated when the reaction mixture was chilled and diluted to about 50-ml volume with ice and water. Recrystallization of the gummy product from ethyl alcohol yielded bronze crystals. Additional amounts were obtained from the filtrates by seeding and chilling the solutions. Total crude yield was 0.87 g (36%).

The MCM compound was recrystallized twice from methanol. Each time, additional amounts were recovered from the filtrates. Yield: 0.53 g (22%) m.p. 247°–248° C.

Imaging Apparatus

An imaging apparatus was used in each of the following examples to carry out the PEP imaging process described herein. This apparatus was a device of the type illustrated in FIG. 1. In this apparatus, a translating film base having a conductive coating of 0.1 optical density cermet (Cr.SiO) served as electrode 1 and was in pressure contact with a 10-cm-diameter aluminum roller 14 covered with dielectric paper coated with poly(vinyl butyral) resin which served as electrode 5. Electrode 1 was supported by rubber drive rollers 10 positioned beneath and spaced sufficiently apart from electrode 1 to allow exposure of electrically photosensitive material 4 to activating radiation. The light source consisted of an Ektagraphic AV 434 A TM Projector with a 1000-watt xenon lamp. The light was modulated with a Kodak TM No. 5 flexible M-carbon, 0.3 neutral density, 11 step tablet taped to the backside of electrode 1. The residence time in the action or exposure zone was 10 milliseconds. The voltage between the electrode 5 and electrode 1 was about 2 kv and the current was about 10 microamps. Electrode 1 was of negative polarity in the case where electrically photosensitive material 4 carried a positive electrostatic charge, and electrode 1 was positive in the case where electrically photosensitive electrostatically charged particles were negatively charged. The translational speed of electrode 1 was about 25 cm/second. In the following examples, image formation occurs on the surfaces of electrode 1 and electrode 5 after simultaneous application of light exposure and electric field to electrically photosensitive material 4 formed from the dispersion of electrically photosensitive material containing an MCM compound in a liquid carrier. The liquid imaging dispersion was placed in nip 21 between the electrodes 1 and 5. If the material being evaluated for use possessed a useful level of electrical photosensitivity, one obtained a negative-appearing image reproduction of original 11 on electrode 5 and a positive image on electrode 1.

Imaging Dispersion Preparation

Imaging dispersions were prepared to evaluate each of the compounds in Table I. The dispersions were prepared by first making a stock solution of the following components. The stock solution was prepared simply by combining the components.

| | |
|---|---|
| Isopar G TM | 2.2 parts by weight |
| Solvesso 100 TM | 1.3 parts by weight |
| Piccotex 100 TM | 1.4 parts by weight |
| PVT | 0.1 parts by weight |

PVT is poly(vinyltoluene-co-lauryl methacrylate-co-lithium methacrylate-comethacrylic acid) 56/40/3.6/0.4.
Piccotex 100 TM is a mixture of styrene-vinyl toluene copolymers available from Pennsylvania Industrial Chemical Corp.
Isopar G TM is an isoparaffinic aliphatic hydrocarbon available from Exxon Corporation.
Solvesso 100 TM is an alkylated aromatic hydrocarbon liquid available from Exxon Corporation.

A 5-g aliquot of the stock solution was combined in a closed container with 0.045 g of the Table I compound to be tested and 12 g of Pioneer 440 TM stainless-steel balls. The mixture was then milled for 3 hr on a paint shaker.

EXAMPLES 1–6

Table I compounds A–F were tested according to the above procedures and found to be electrophoretic as evidenced by obtaining a negative-appearing image of the original on one electrode and a positive image on the other electrode. Compounds A and D provided the best image quality. Image quality was determined visually on the basis of minimum and maximum densities.

Relative sensitivity was determined by normalizing to 100 to reciprocal of the clear exposure in ergs/cm² needed by the dispersion containing Compound 1 to produce a density of 0.10 above $D_{min}$ on the negative image. The exposure necessary to produce the same density for the other dispersions was determined relative to the 100 value of the dispersion of Compound A as a control. The results are reported in Table II below.

The light stability of Compounds A and D–F was determined by the following fade test: Images composed of the compounds were exposed to high-intensity daylight (HID) (50,000 lux) for 24 hr. The loss in density at $D_{max}$ was measured spectroscopically and determined as a percentage loss from the unexposed image. The results are reported in Table II.

TABLE II

| Example/ Compound | $D_{max}$ | $D_{min}$ | Relative Sensitivity | % Fade (24 hr HID) |
|---|---|---|---|---|
| 1/A | 0.64 | 0.01 | 100 | 11% |
| 2/B | 0.66 | 0.08 | 61 | * |
| 3/C | 0.52 | 0 | 35 | * |
| 4/D | 0.75 | 0.01 | 100 | 4.1 |
| 5/E | 0.60 | 0.01 | 41 | 11.4 |
| 6/F | 0.32 | 0.01 | 6 | 40.6 |

*not evaluated

The invention has been described in detail with particular reference to preferred embodiments thereof, but it will be understood that variations and modifications can be effected within the spirit and scope of the invention.

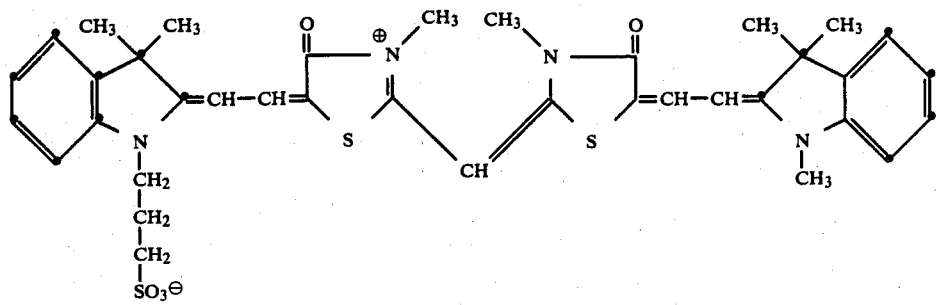

What is claimed is:

1. An electrically photosensitive material comprising an electrically insulating carrier, either liquid or liquefiable under use, and a plurality of electrically photosensitive particles comprising a compound having the following color-conferring group:

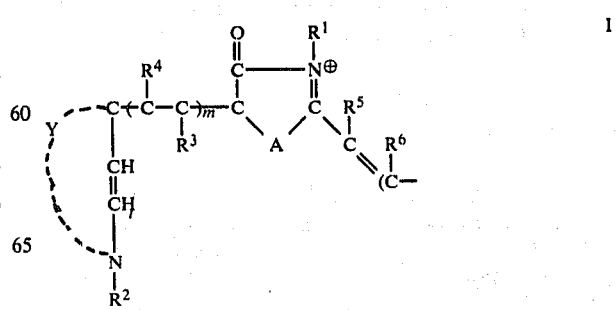

-continued

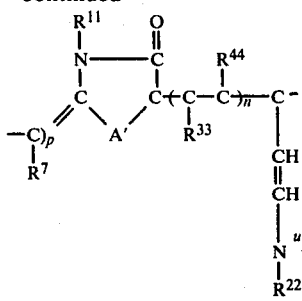

wherein:
 m and n, which are the same or different, are 0, 1 or 2;
 t and u, which are the same or different, are 0 or 1;
 p is 0, 1 or 2;
 $R^1$ and $R^{11}$, which are the same or different, represent an alkyl, aryl, aralkyl, alkaryl, carbocyclic or heterocyclic group;
 $R^2$ and $R^{22}$, which are the same or different, represent an alkyl, aryl, aralkyl, alkaryl, carbocyclic or heterocyclic group;
 $R^3$ and $R^{33}$, which are the same or different, represent hydrogen or an alkyl group;
 $R^4$ and $R^{44}$, which are the same or different, represent hydrogen or an alkyl group;
 $R^4$, when taken together with $R^2$ and t is 0, and $R^{44}$, when taken together with $R^{22}$ and u is 0, represent the atoms necessary to complete an alkylene or heteroalkylene bridge;
 $R^3$ and $R^4$, and $R^{33}$ and $R^{44}$, when taken together represent the atoms necessary to complete an alkylene or heteroalkylene bridge;
 $R^5$, $R^6$ and $R^7$, which are the same or different, represent hydrogen or an alkyl group or, when individually taken together with $R^1$ or $R^{11}$, represent the atoms necessary to complete an alkylene or heteroalkylene bridge;
 Y and $Y^1$, which are the same or different, represent the atoms necessary to complete a basic heterocyclic cyanine dye nucleus; and
 A and $A^1$, which are the same or different, represent oxygen, sulfur, selenium or $-NR^8$, wherein $R^8$ represents an alkyl, aryl, aralkyl, alkaryl, carbocyclic or heterocyclic group.

2. A material as in claim 1 wherein said cyanine dye nucleus is selected from the group of nuclei consisting of:
 (a) thiazole;
 (b) oxazole;
 (c) selenazole;
 (d) thiazoline;
 (e) quinoline;
 (f) imidazole;
 (g) indole;
 (h) pyridine;
 (i) pyrazole;
 (j) diazole
 (k) pyrrole; and
 (l) pyran.

3. A material as in claims 1 or 2 wherein:
 $R^1$ and $R^{11}$, which are the same or different, represent alkyl;
 $R^2$ and $R^{22}$, which are the same or different, represent alkyl;

$R^3$, $R^{33}$, $R^4$, and $R^{44}$ are hydrogen; and
 A and A', which are the same or different, represent oxygen or sulfur.

4. A material as in claim 3 wherein said cyanine dye nucleus is an indole nucleus.

5. A material as in claims 1, 2 or 4 wherein said compound is asymmetric.

6. A material as in claims 1, 2 or 4 wherein said compound is symmetric.

7. A material as in claims 1, 2 or 4 wherein said compound is zwitterionic.

8. An electrically photosensitive material comprising an electrically insulating carrier, either liquid or liquefiable under use, and a plurality of electrically photosensitive particles comprising a compound having the following color-conferring group:

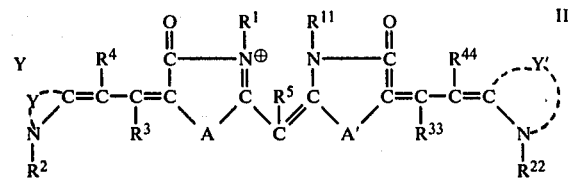

wherein:
 $R^1$ and $R^{11}$, which are the same or different, represent an alkyl, aryl, aralkyl, alkaryl, carbocyclic or heterocyclic group;
 $R^2$ and $R^{22}$, which are the same or different, represent an alkyl, aryl, aralkyl, alkaryl, carbocyclic or heterocyclic group;
 $R^3$ and $R^{33}$, which are the same or different, represent hydrogen or an alkyl group;
 $R^4$ and $R^{44}$, which are the same or different, represent hydrogen or an alkyl group;
 $R^4$, when taken together with $R^2$ and t is 0, and $R^{44}$, when taken together with $R^{22}$ and u is 0, represent the atoms necessary to complete an alkylene or heteroalkylene bridge;
 $R^5$ represents hydrogen or an alkyl group;
 Y and $Y^1$, which are the same or different, represent the atoms necessary to complete a basic heterocyclic cyanine dye nucleus; and
 A and $A^1$, which are the same or different, represent oxygen, sulfur, selenium or $-NR^8$, wherein $R^8$ represents an alkyl, aryl, aralkyl, alkaryl, carbocyclic or heterocyclic group.

9. A material as in claim 8 wherein said cyanine dye nucleus is selected from the group of nuclei consisting of:
 (a) thiazole;
 (b) oxazole;
 (c) selenazole;
 (d) thiazoline;
 (e) quinoline;
 (f) imidazole;
 (g) indole;
 (h) pyridine;
 (i) pyrazole;
 (j) diazole;
 (k) pyrrole; and
 (l) pyran.

10. A material as in claims 8 or 9 wherein:
 $R^1$ and $R^{11}$, which are the same or different, represent alkyl;

R² and R²², which are the same or different, represent alkyl;
R³, R³³, R⁴, and R⁴⁴ are hydrogen; and
A and A', which are the same or different, represent oxygen or sulfur.
11. A material as in claim 9 wherein said cyanine dye nucleus is 3,3-dialkyl-3H-indole nucleus.
12. A material as in claim 8 wherein said compound is selected from the group consisting of:
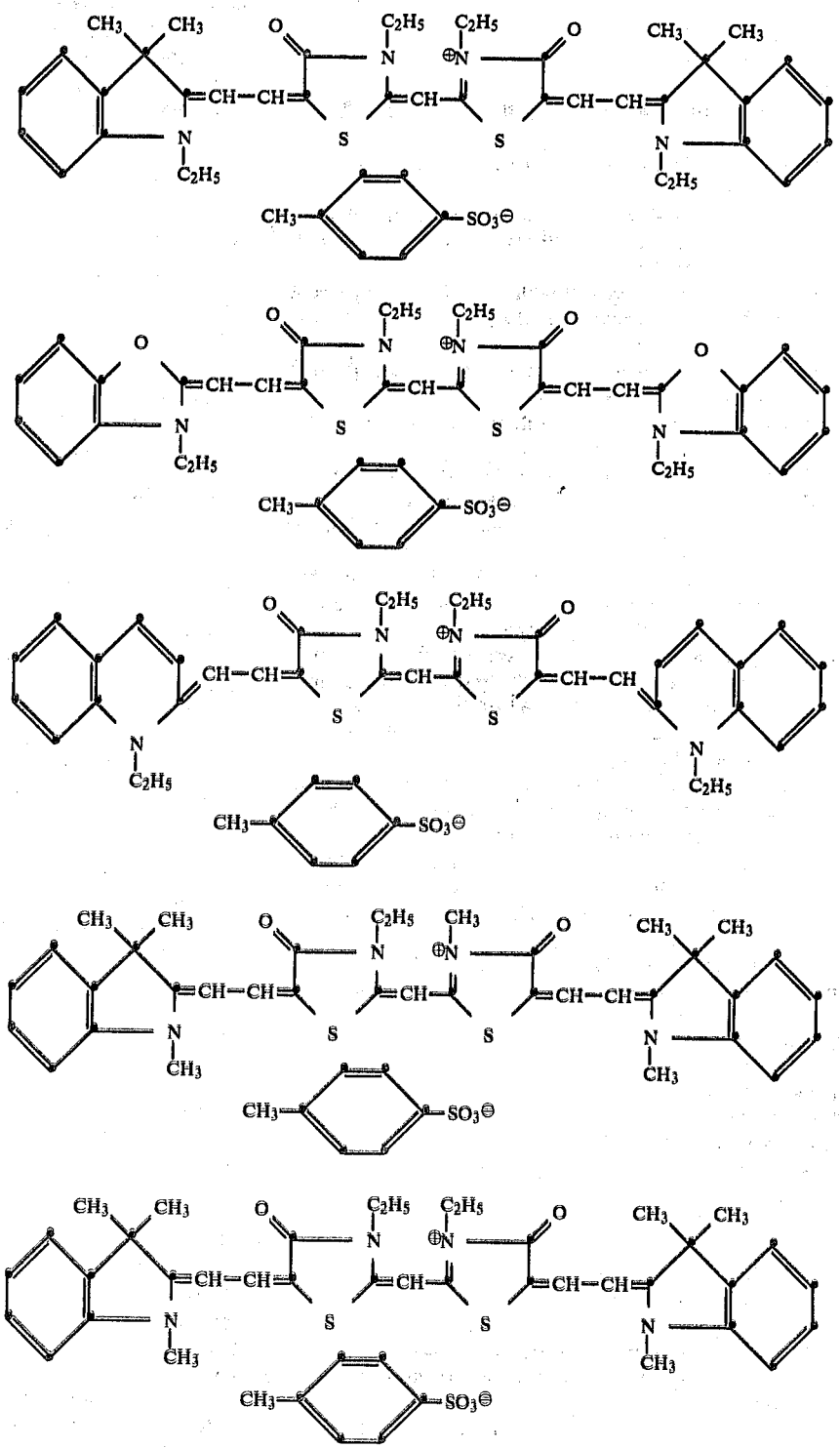

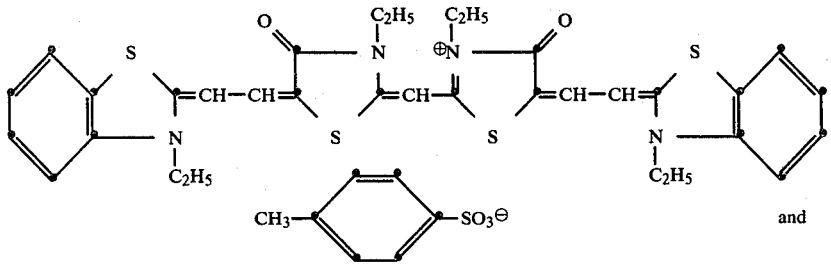

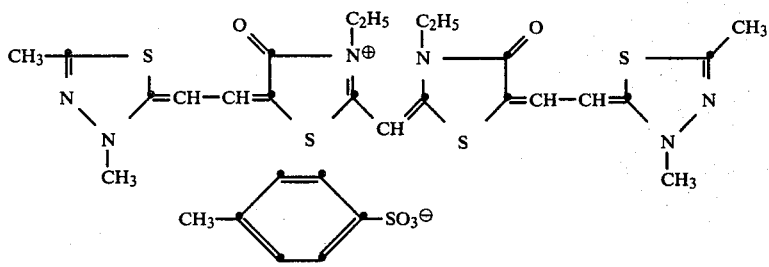

13. A material as in claim 8 wherein said compound is:

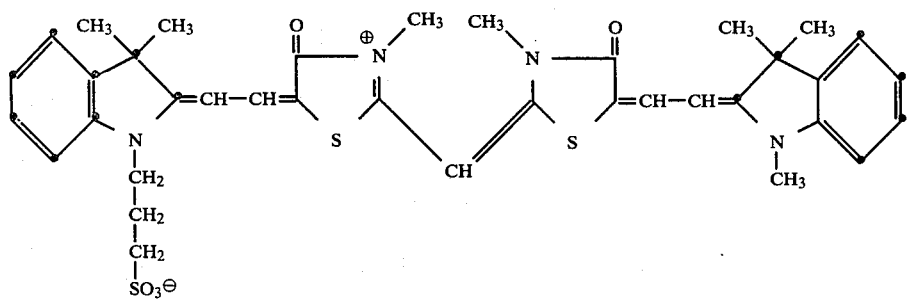

14. A material as in claims 8, 9 or 11 wherein said compound is asymmetric.

15. A material as in claims 8, 9 or 11 wherein said compound is symmetric.

16. A material as in claim 8, 9 or 11 additionally comprising a charge control agent.

17. An imaging element comprising a layer of an electrically photosensitive material which comprises an electrically insulating carrier either liquid or liquifiable under use and a plurality of electrically photosensitive particles comprising a colorant compound containing the following structure:

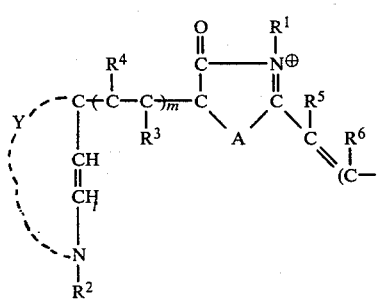

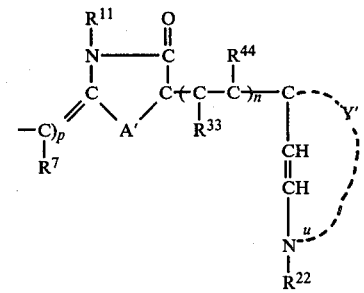

wherein:
m and n, which are the same or different, are 0, 1 or 2;
t and u, which are the same or different, are 0 or 1;
p is 0, 1 or 2;
$R^1$ and $R^{11}$, which are the same or different, represent an alkyl, aryl, aralkyl, alkaryl, carbocyclic or heterocyclic group or, when taken together and p is zero, are a one- or two-carbon alkylene bridge;
$R^2$ and $R^{22}$, which are the same or different, represent an alkyl, aryl, aralkyl, alkaryl, carbocyclic or heterocyclic group;
$R^3$ and $R^{33}$, which are the same or different, represent hydrogen or an alkyl group;
$R^4$ and $R^{44}$, which are the same or different, represent hydrogen or an alkyl group;

$R^4$, which when taken together with $R^2$ and t is 0, and $R^{44}$ which when taken together with $R^{22}$ and u is 0, represent the atoms necessary to complete an alkylene or heteroalkylene bridge;

$R^3$ and $R^4$, and $R^{33}$ and $R^{44}$, when taken together represent the atoms necessary to complete an alkylene or heteroalkylene bridge, $R^5$, $R^6$ and $R^7$, which are the same or different, represent hydrogen or an alkyl group or, when individually taken together with $R^1$ or $R^{11}$, represent the atoms necessary to complete an alkylene or heteroalkylene bridge; and Y and Y', which are the same or different, represent the atoms necessary to complete a basic heterocyclic cyanine dye nucleus; and A and $A^1$, which are the same or different, represent oxygen, sulfur, selenium or $-NR^8$ wherein $R^8$ represents an alkyl, aryl, aralkyl, alkaryl, carbocyclic or heterocyclic group.

18. The imaging element as in claim 17 wherein said cyanine dye nucleus is selected from the group of nuclei consisting of:
(a) thiazole;
(b) oxazole;
(c) selenazole;
(d) thiazoline;
(e) quinoline;
(f) imidazole;
(g) indole;
(h) pyridine;
(i) pyrazole;
(j) diazole;
(k) pyrrole; and
(l) pyran.

19. An imaging element comprising an electrically insulating carrier either liquid or liquifiable under use and a plurality of electrically photosensitive particles comprising a colorant compound containing the structure:

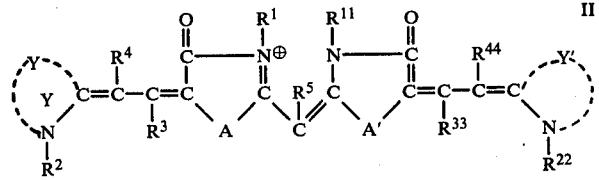

II wherein:
$R^1$ and $R^{11}$, which are the same or different, represent an alkyl, aryl, aralkyl, alkaryl, carbocyclic or heterocyclic group or, when taken together, are a one- or two-carbon alkylene bridge;

$R^2$ and $R^{22}$, which are the same or different, represent an alkyl, aryl, aralkyl, alkaryl, carbocyclic or heterocyclic group;

$R^3$ and $R^{33}$, which are the same or different, represent hydrogen or an alkyl group;

$R^4$ and $R^{44}$, which are the same or different, represent hydrogen or an alkyl group;

$R^4$, which when taken together with $R^2$ and t is 0, and $R^{44}$ which, when taken together with $R^{22}$ and u is 0, represent the atoms necessary to complete an alkylene or hetero alkylene bridge, $R^5$ represents hydrogen or an alkyl group;

Y and Y', which are the same or different, represent the atoms necessary to complete a basic heterocyclic cyanine dye nucleus; and A and $A^1$, which are the same or different, represent oxygen, sulfur, selenium or $-NR^8$ wherein $R^8$ represents an alkyl, aryl, aralkyl, alkaryl, carbocyclic or heterocyclic group.

20. A material as in claim 19 wherein said cyanine dye nucleus is selected from the group of nuclei consisting of:
(a) thiazole;
(b) oxazole;
(c) selenazole;
(d) thiazoline;
(e) quinoline;
(f) imidazole;
(g) indole;
(h) pyridine;
(i) pyrazole;
(j) diazole;
(k) pyrrole; and
(l) pyran.

21. An imaging element as in claims 19 or 20 wherein said electrically photosensitive material additionally comprises a charge control agent.

22. An imaging element as in claim 21 wherein said compound is selected from the group consisting of:

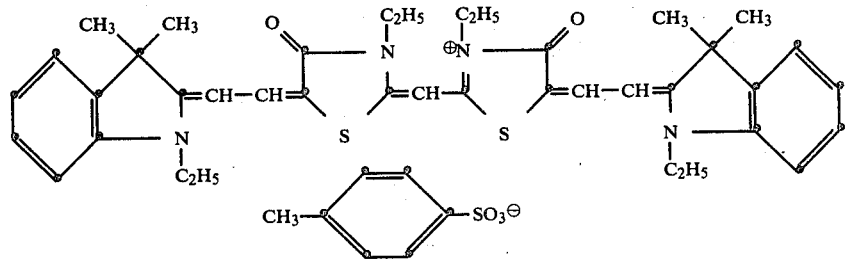

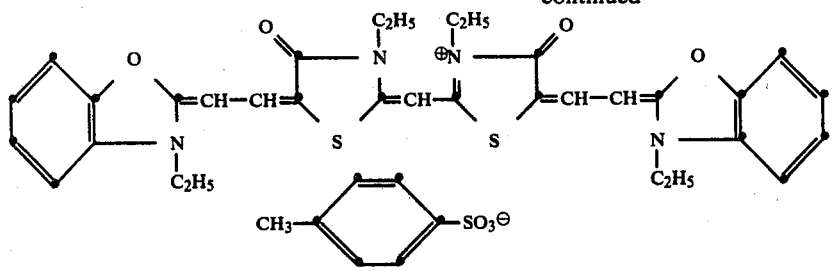
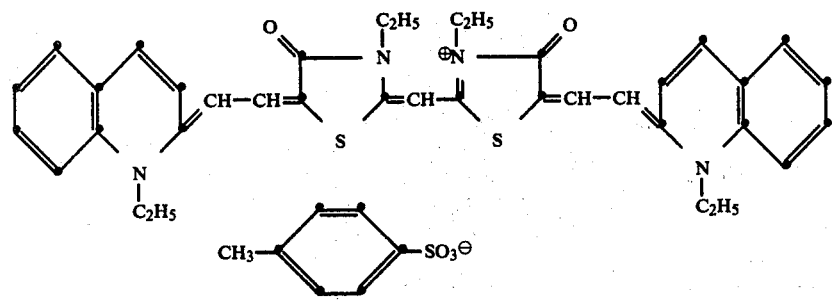
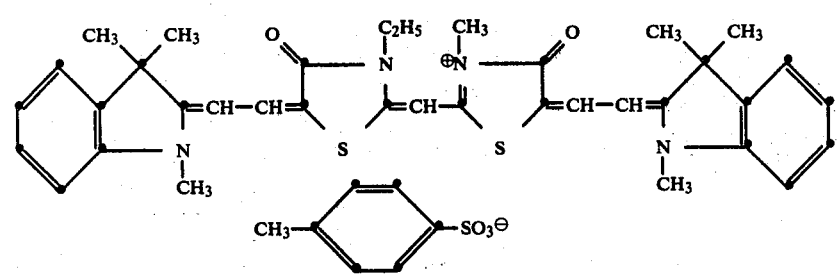
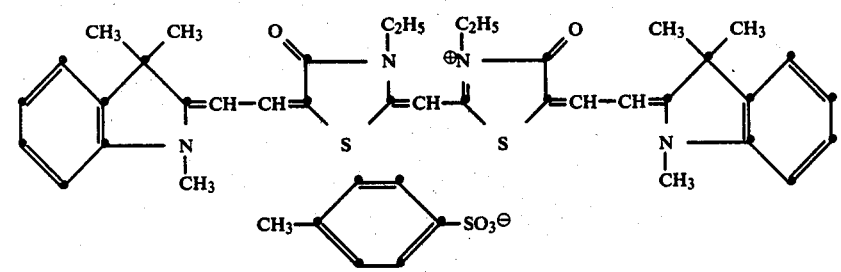
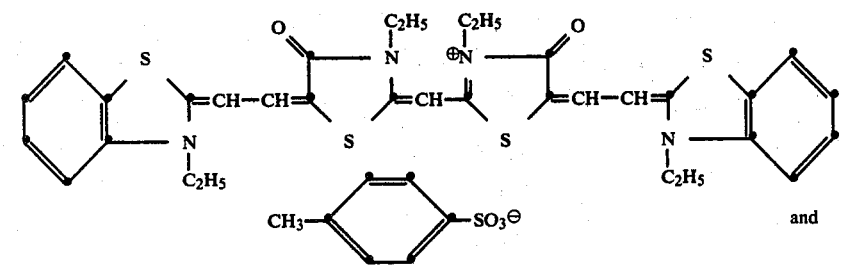
and
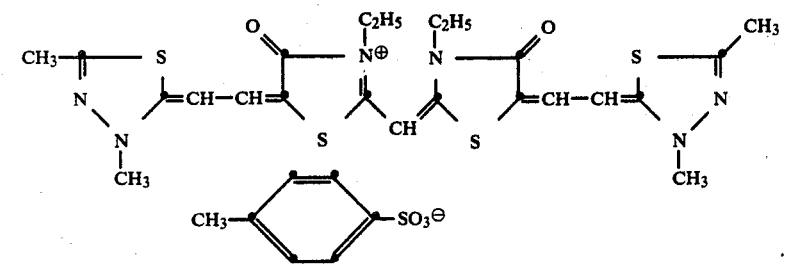

23. An imaging element as in claim 21 wherein said compound is:

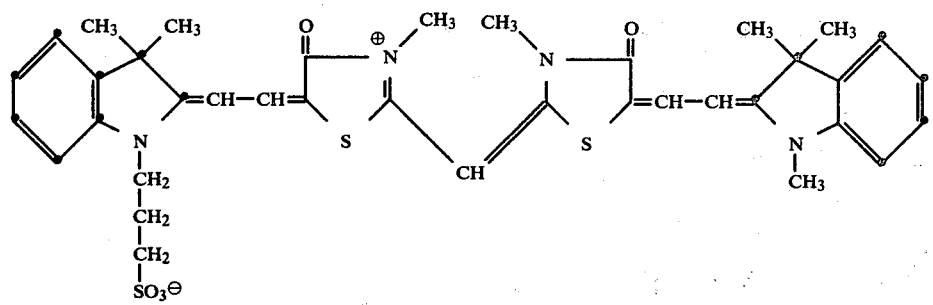

24. A photoelectrophoretic image-recording method comprising the steps of:
(a) subjecting an imaging element comprising a layer of an electrically photosensitive material to an electrical field, and
(b) exposing said element to an image pattern of electromagnetic radiation to which said layer is photosensitive to form a record of the image pattern of electromagnetic radiation in said layer, wherein said electrically photosensitive material comprises an electrically insulating carrier, either liquid or liquefiable under use, and a plurality of electrically photosensitive particles comprising a compound having the following color-conferring group:

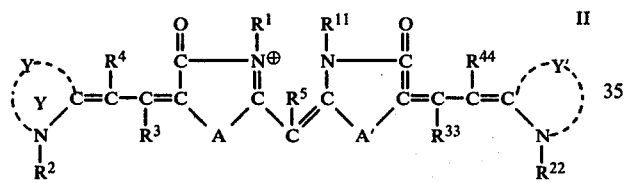

wherein:

$R^1$ and $R^{11}$, which are the same or different, represent an alkyl, aryl, aralkyl, alkaryl, carbocyclic or heterocyclic group;

$R^2$ and $R^{22}$, which are the same or different, represent an alkyl, aryl, aralkyl, alkaryl, carbocyclic or heterocyclic group;

$R^3$ and $R^{33}$, which are the same or different, represent hydrogen or an alkyl group;

$R^4$ and $R^{44}$, which are the same or different, represent hydrogen or an alkyl group;

$R^4$, when taken together with $R^2$ and t is 0, and $R^{44}$, when taken together with $R^{22}$ and u is 0, represent the atoms necessary to complete an alkylene or heteroalkylene bridge;

$R^5$ represents hydrogen or an alkyl group;

Y and $Y^1$, which are the same or different, represent the atoms necessary to complete a basic heterocyclic cyanine dye nucleus; and A and $A^1$, which are the same or different, represent oxygen, sulfur, selenium or —$NR^8$, wherein $R^8$ represents an alkyl, aryl, aralkyl, alkaryl, carbocyclic or heterocyclic group.

25. A method as in claim 24 further comprising the step of heating to liquify said material and, while said material is liquid, carrying out steps (a) and (b).

26. A photoelectrophoretic image-recording method of claim 24 or 25 wherein said electrically photosensitive material additionally comprises a charge control agent and said compound is selected from the group consisting of:

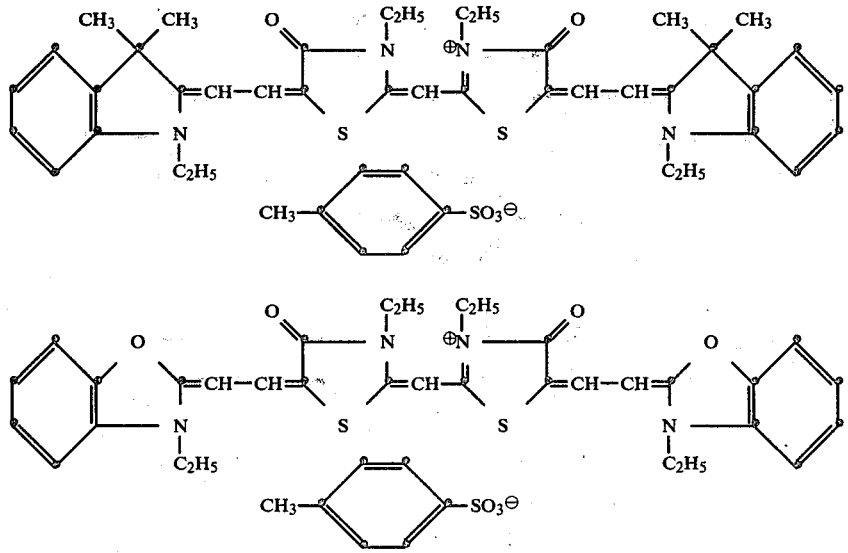

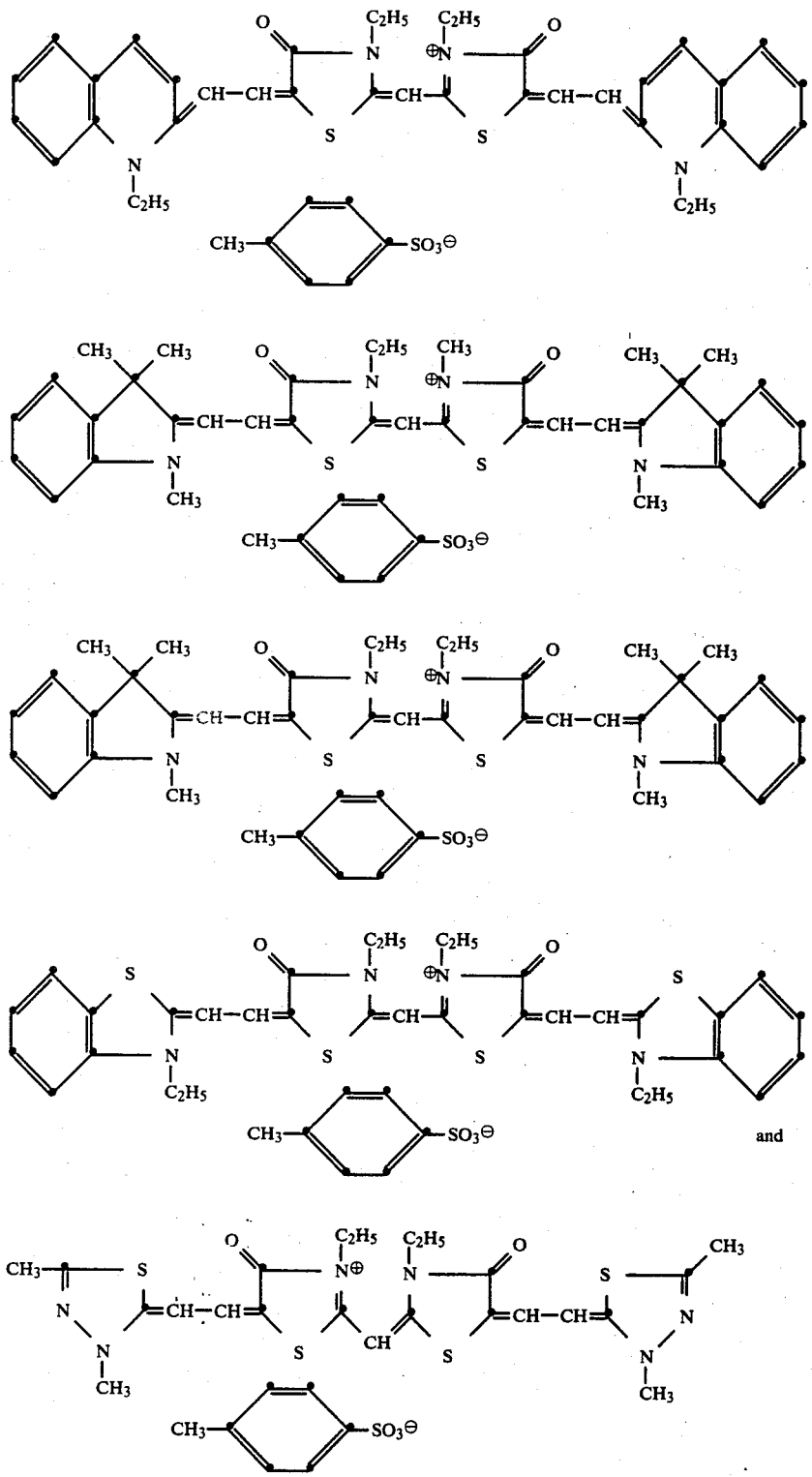
27. A photoelectrophoretic image-recording method of claims 24 or 25 wherein said electrically photosensitive material additionally comprises a charge control agent and said compound is: